United States Patent [19]

Suzuki

[11] Patent Number: 5,261,040
[45] Date of Patent: Nov. 9, 1993

[54] TEXT PROCESSING APPARATUS
[75] Inventor: Naohisa Suzuki, Yokohama, Japan
[73] Assignee: Canon Kabushiki Kaisha, Tokyo, Japan
[21] Appl. No.: 831,748
[22] Filed: Feb. 10, 1992

Related U.S. Application Data

[63] Continuation of Ser. No. 609,078, Nov. 7, 1990, abandoned, which is a continuation of Ser. No. 69,227, Jul. 2, 1987, abandoned.

[30] Foreign Application Priority Data

Jul. 11, 1986 [JP] Japan .............................. 61-163063

[51] Int. Cl.$^5$ ............................................. G06F 15/20
[52] U.S. Cl. .................... 345/146; 395/144; 395/145; 400/83
[58] Field of Search ....................... 340/703, 723, 731; 600/83, 63; 395/144, 145, 146

[56] References Cited

U.S. PATENT DOCUMENTS

| | | | |
|---|---|---|---|
| 4,158,236 | 6/1979 | Levy .................................. | 364/900 |
| 4,384,338 | 5/1983 | Bennett .............................. | 364/522 |
| 4,489,389 | 12/1984 | Beckwith et al. .................. | 364/522 |
| 4,627,002 | 12/1986 | Blum et al. ......................... | 364/519 |
| 4,660,157 | 4/1987 | Beckwith et al. .................. | 364/522 |
| 4,663,731 | 5/1987 | Ikegami et al. .................... | 364/900 |
| 4,742,558 | 5/1988 | Ishibashi et al. ................... | 382/56 |
| 4,811,240 | 3/1989 | Ballou et al. ...................... | 364/518 |
| 5,021,972 | 6/1991 | Nishi .................................. | 364/518 |

OTHER PUBLICATIONS

McGilton et al. "Introducing the UNIX System" McGraw Hill Book Company 1983 pp. 167-175.

Primary Examiner—Phu K. Nguyen
Attorney, Agent, or Firm—Fitzpatrick, Cella, Harper & Scinto

[57] ABSTRACT

A text processing apparatus includes: an external storage device which stores text data and is detachable for the main body of the apparatus; an internal storage device fixed in the main body of the apparatus; a display device to display the text data; an editing processor for transferring the text data stored in the external storage device to the internal storage device and for editing processing; and a comparison display device for comparing the text data which was edited processed by the editing processor with the text data which has already been stored in the external storage device, and for displaying the portion of the text data different from the text data stored in the external storage device by inverting the black-and-white indication of this data. The internal and external storage devices have the same memory structure and the same memory capacity. With this apparatus, the text data stored in the internal and external storage devices can be compared on a text unit basis or on a page unit basis without frequently accessing the external storage device. The newly added or modified text data can be easily checked.

26 Claims, 11 Drawing Sheets

FIG. 4

| | DOCUMENT TITLE | DOCUMENT | PAGE CAPACITY | START CLUSTER | REWRITE ATTRIBUTE | SUM |
|---|---|---|---|---|---|---|
| #1 | COOK BOOK | #1 | 2 | #2 | 0 | EBH |
| #2 | INFORMATION | #2 | 1 | #26 | 0 | OBH |

Columns: 20, 21, 22, 23, 24, 25

FIG. 5

| CLUSTER | | |
|---|---|---|
| #1 | DIRECTORY | |
| #2 | COOK BOOK (1) | 26 |
| #3 | COOK BOOK (2) | 27 |
| #4 | UNUSED | |
| ⋮ | ⋮ | |
| #25 | COOK BOOK (3) | 28 |
| #26 | INFORMATION (1) | |

| | DOCUMENT TITLE | DOCUMENT | PAGE CAPACITY | START CLUSTER | REWRITE ATTRIBUTE | SUM |
|---|---|---|---|---|---|---|
| #1 | COOK BOOK | #1 | 3 | #2 | 2 | FAH |
| #2 | INFORMATION | #2 | 1 | #26 | 0 | OBH |

35 36 37 38 39 40

| # 1  | DIRECTORY       |     |
|------|-----------------|-----|
| # 2  | COOK BOOK (1)   | ~41 |
| # 3  | COOK BOOK (2)   | ~42 |
| # 4  | COOK BOOK (4)   | ~44 |
|      |                 |     |
| #25  | COOK BOOK (3)   | ~43 |
| #26  | INFORMATION (1) |     |

```
Title : COOK  BOOK         page -2-
ЦЦЦЦЦЦЦЦЦ
    Message List
        ARABIC              1
        ARMENIAN            2
        BELORUSSIAN         3
        BENGALI             4
        BULGARIAN           5
        GREEK               6
        HINDI               7
```

```
Title : COOK  BOOK         page -2-
ЦЦЦЦЦЦЦЦЦ
    Message  List
        ARABIC              1
        ARMENIAN            2
        BELORUSSIAN         3
        BENGALI             4
        BULGARIAN           5
        CHINESE             6
        GREEK               7      — 50
        HINDI               8
```

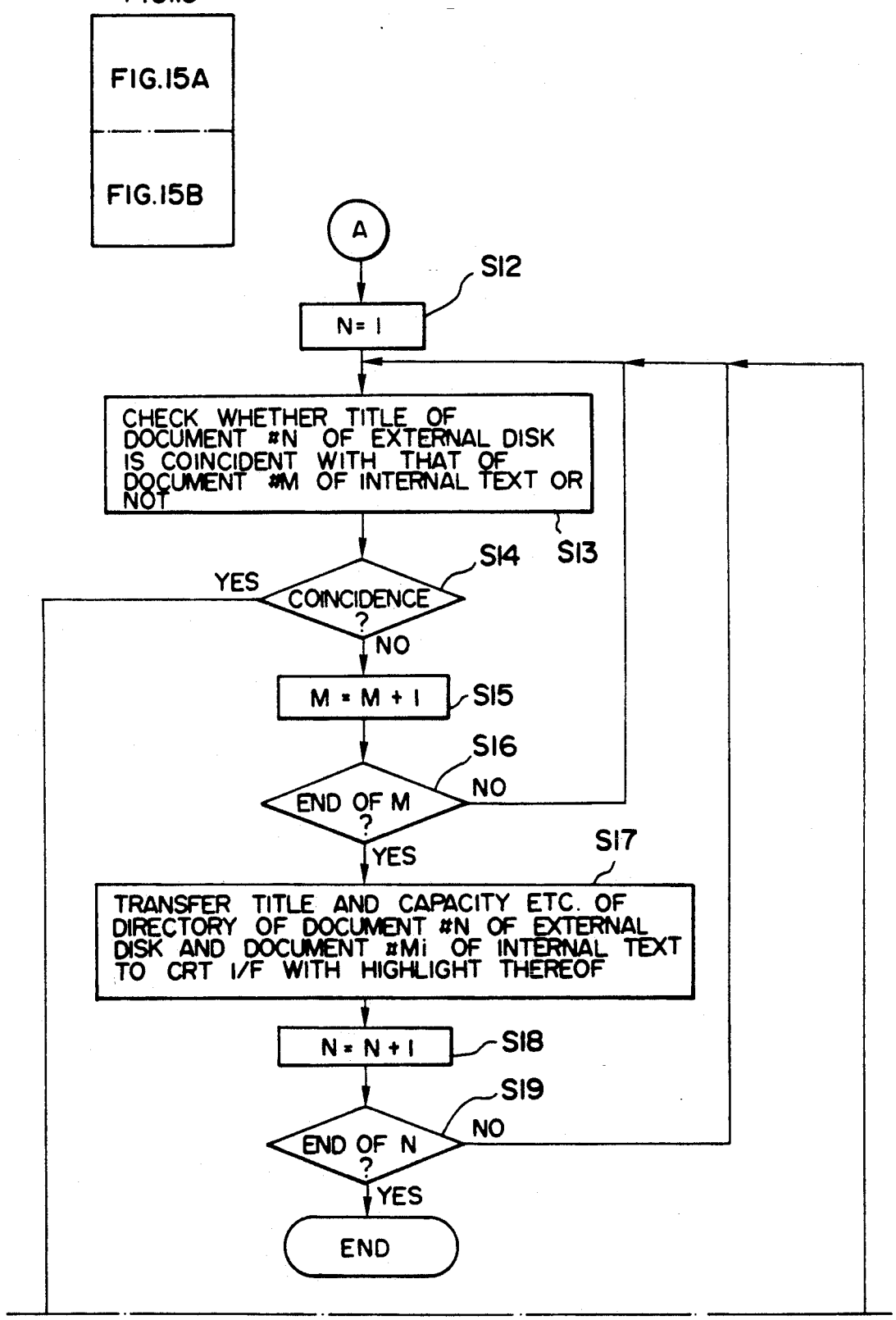

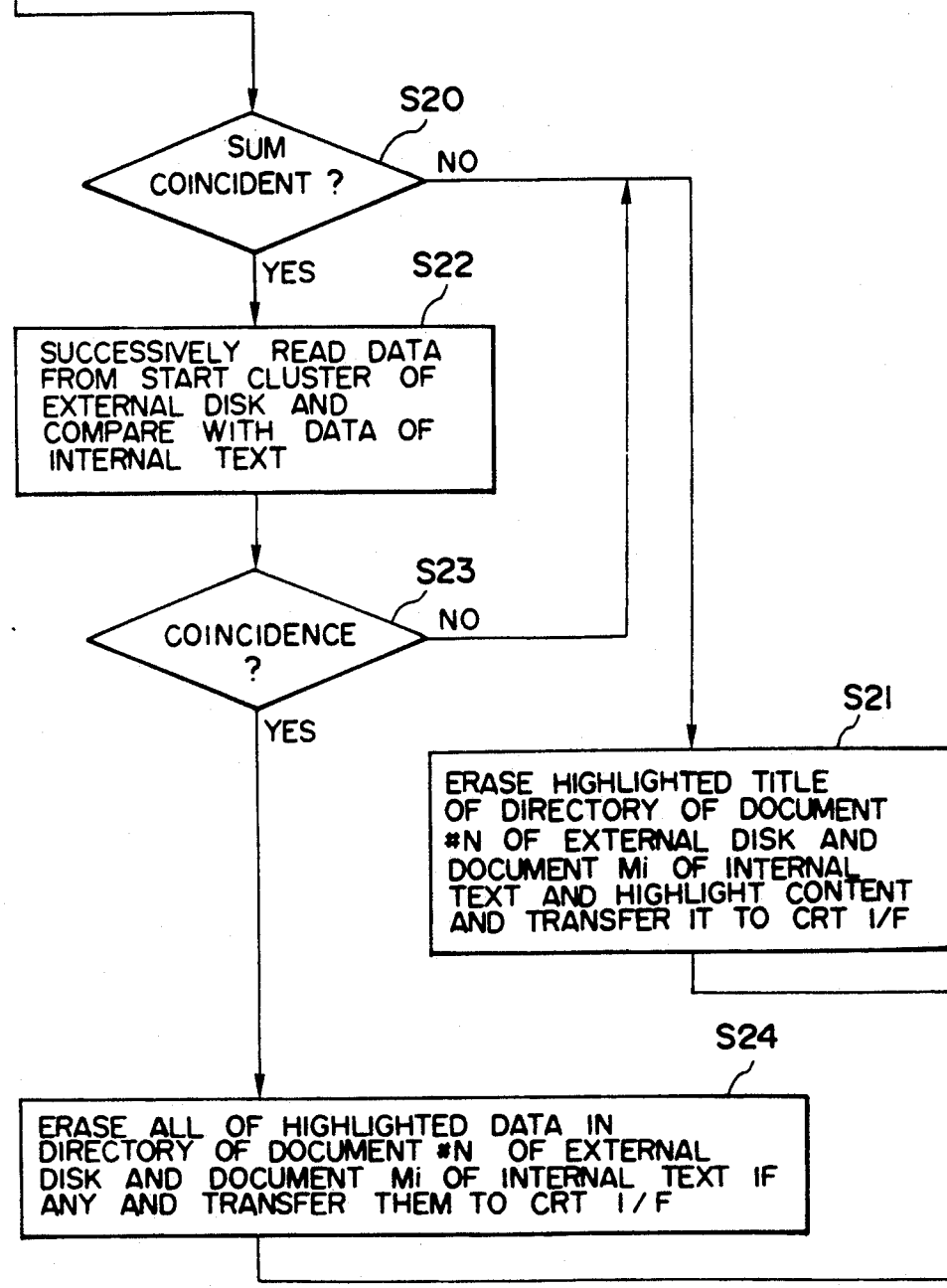

TEXT PROCESSING APPARATUS

This application is a continuation of application Ser. No. 07/609,078 filed Nov. 7, 1990, now abandoned, which in turn is a continuation of Ser. No. 07/069,227 filed Jul. 2, 1987, now abandoned.

BACKGROUND OF THE INVENTION

1. Field of the Invention

The present invention relates to a text processing apparatus comprising an internal storage device and an external storage device, wherein text data stored in the internal storage device and text data stored in the external storage device can be compared on a text unit basis or on a page unit basis.

2. Related Background Art

In general, in a text processing apparatus having an internal storage device, an external storage medium such as a hard disk device or the like has a larger capacity than that of the internal storage medium, so that all of the data in the external storage medium cannot be developed or transferred to in the internal storage medium. Therefore, in such a text processing apparatus, a program and data are sequentially read out of the external storage medium and stored in the internal storage medium, then various kinds of processes are executed and text editing is performed. In the text processing apparatus of such a type that necessary data is sequentially read out of the external storage medium and developed in the internal storage medium as described above, the external storage medium needs to be accessed at random. For the management of tasks and files, complicated processes such as display and the like are also necessary. On the other hand, in a text processing apparatus such as a word processor, electronic typewriter, or the like having a single function, an external storage medium such as an IC card, a RAM, an FDD, a cassette, or the like is used and at the same time, a ROM is provided as an internal storage medium for the main system. Texts, extended dictionary, display fonts, and the like are stored as external data and released for the user. Even those apparatuses cannot develop all of the text in the external storage medium in the internal storage medium when the text is edited. It is necessary to again store the text in the external storage medium after editing. The document processing apparatus as mentioned above has several disadvantages; for example; change points between the edited text file and task and the file and task in the external storage device before editing cannot be sufficiently known. Further, the disk needs to be accessed many times. Thus, the working efficiency of the device is very low.

SUMMARY OF THE INVENTION

The present invention is made in consideration of the foregoing drawbacks in conventional techniques. It is an object of the invention to provide a text processing apparatus in which the foregoing drawbacks in the conventional techniques can be eliminated. It is another object of the present invention to reduce the need to frequently access an external storage device, thereby raising the working efficiency of the device. It is another object of the present invention to provide a text processing device which permits the operator to easily confirm the difference between the text during the text editing and the content of the external storage device.

Another object of the present invention is to provide a device in which an external storage medium and an internal storage medium of a text processing apparatus have the same memory structure and the same memory capacity, in which data can be freely transmitted and received between the external and internal storage media, in which the data stored in the external storage medium and the data stored in the internal storage medium are compared for every document, and when they do not coincide, the relevant document data is displayed by inverting the black and white indication or displaying relevant document data in a blinking manner.

BRIEF DESCRIPTION OF THE DRAWINGS

FIG. 4 is a diagram showing a document directory;

FIG. 5 is a diagram showing a data area;

FIGS. 13 to 15 are flowcharts for processes of an MPU 1.

DETAILED DESCRIPTION OF THE EMBODIMENT

Figure 1:
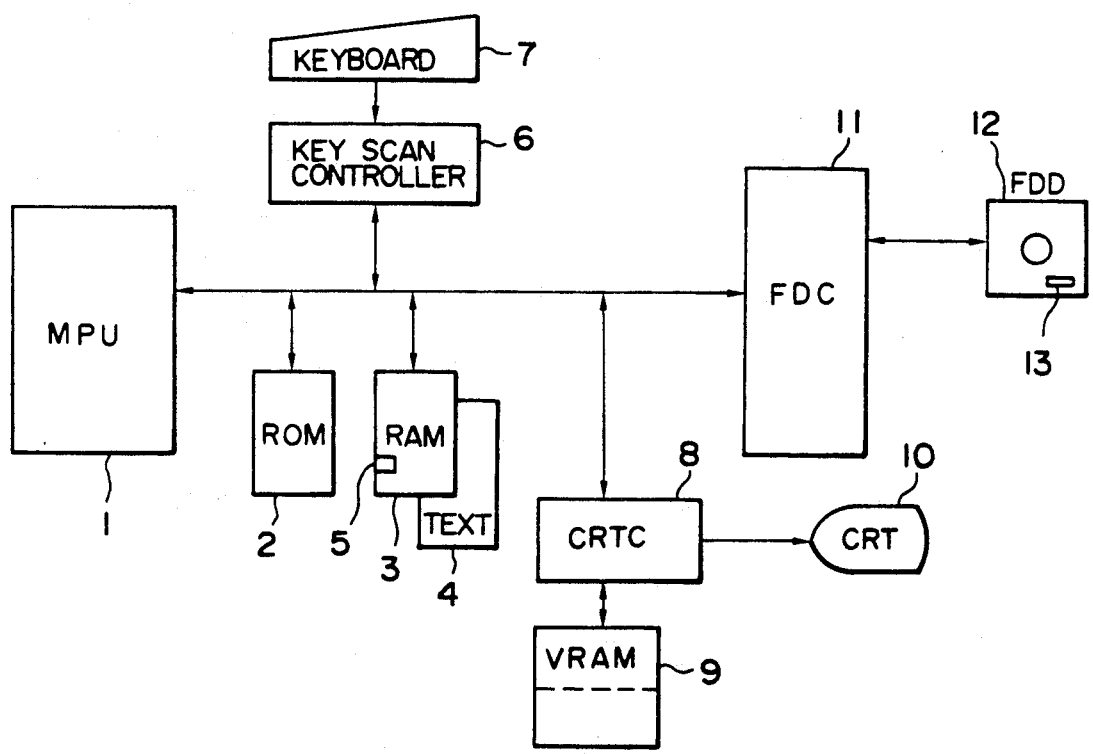
FIG. 1 is a block diagram of a text processing apparatus of an embodiment of the present invention.

An embodiment of the present invention will be described hereinbelow. FIG. 1 is a system block diagram of a word processor apparatus according to the present invention. As shown in the diagram, this apparatus comprises: an arithmetic operation processing unit (MPU) 1 to perform the main control of the apparatus; a read only memory (ROM) 2 in which programs such as procedures shown in FIGS. 13 to 15, which will be explained hereinafter, which are executed by the MPU 1 are stored; random access memories (RAMs) 3 and 4 to store keyboard data, TEXT data, and other various kinds of data, a key scan controller 6; a floppy disk controller (FDC) 11; and a CRT controller (CRTC) 8. These components are connected by a common bus and can transmit and receive microinstructions and data thereamong. With this constitution, in accordance with the microinstructions which have been preliminarily programmed in the ROM 2, the MPU 1 sequentially performs the arithmetic operations and controls described below in connection with an explanation of the operation of the invention. When an arbitrary key on the keyboard 7 is depressed, the micro-coded key data is periodically output through the key scan controller 6 in response to a request from the MPU 1. The FDC 11 drives a floppy disk drive FDD 12, thereby allowing data to be read out or written from/into a floppy disk in accordance with a request from the MPU 1. The CRT controller 8 rewrites character code data developed in a video RAM (VRAM) 9 into character fonts provided in the CRT controller 8 and outputs the data to a CRT 10.

Figure 2:
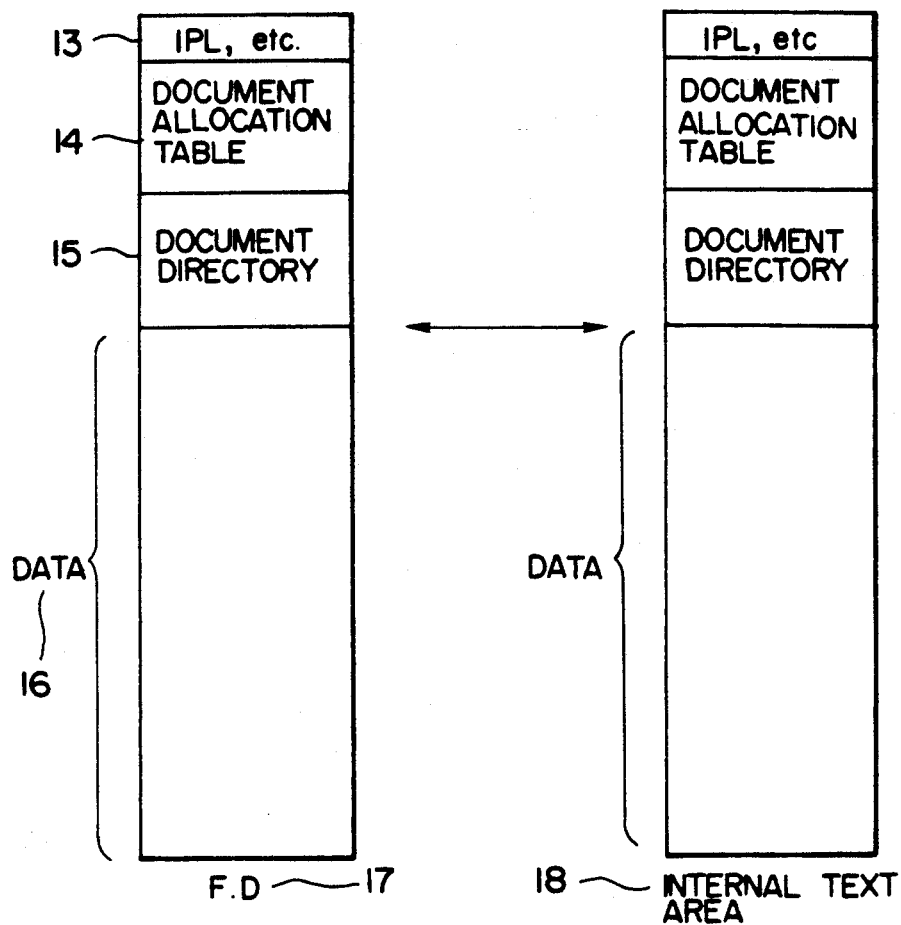
FIG. 2 is a diagram showing an FD 17 and the inside of a TEXT 4.

FIG. 2 shows a data structure 17 in a floppy disk of the FDD 12 and a data structure 18 in the internal TEXT area 4. These data structures have the same structure consisting of an initial program loader IPL 13, a document allocation table 14 to allocate documents, a document directory 15, and a data area 16.

Figure 3:
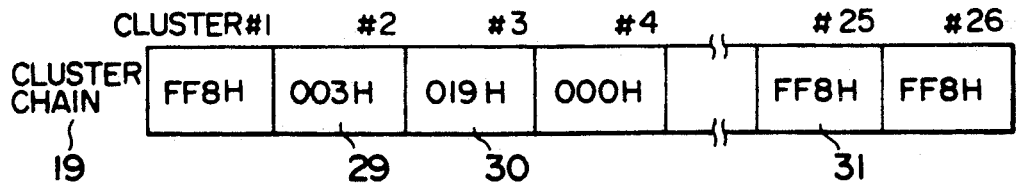
FIG. 3 is a diagram showing a document allocation table.
Figures 6, 7:
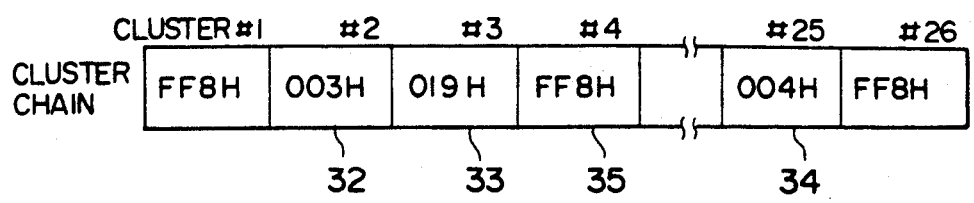
FIG. 6 is a diagram showing a document allocation table.
FIG. 7 is a diagram showing a document directory.
Figures 8, 9:
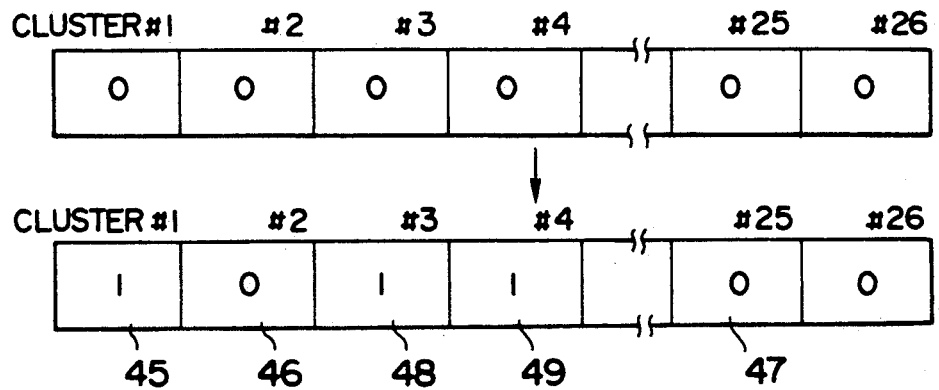
FIG. 8 is a diagram showing a data area.
FIG. 9 is a diagram showing cluster rewrite flags.

FIGS. 3 to 5 are detailed explanatory diagrams of FIG. 2 in a floppy disk of the FDD 12. Data and directory are constituted by clusters #1 to #26. In this case, the cluster #1 is allocated to the directory. As shown in FIG. 4, the directory includes: a document title 20; a document #21; a page capacity 22; a start cluster #23; a rewrite attribute 24; and an SUM 25. Information necessary to search a document is stored in the directory. The document allocation table shown in FIG. 3 is a cluster chain. For example, in the case of a document having the title of "COOK BOOK" in FIG. 4, the start cluster is #2. From FIG. 3, the allocation table of the cluster #2 is HEX "003" 29. This means that the cluster #3 denotes the next area. HEX "019" is written in the allocation table of the cluster #3. This means that the cluster #25 denotes the next area. HEX "FF8" is written in the allocation table of the cluster #25. This means that the connection of the cluster ends here. Namely, the document of "COOK BOOK" has the areas over three clusters #2, #3, and #25 in FIG. 5. On the other hand, HEX "000" written in the cluster #4 in the allocation table in FIG. 3 denotes that the cluster is unused. For example, it is now assumed that there is a disk having memory data such as is shown in FIGS. 3 to 5. This data is accessed to the internal TEXT area 4, a part of the document of "COOK BOOK" is edited, and a constitution of the cluster is changed as shown in FIGS. 6 to 8. In this case, it will be understood that the information, as much as two clusters, thereof was rewritten by the rewrite attribute of FIG. 7. In a manner similar to the above, as a result of the examination of the cluster chain by the directory and allocation table, it will be understood from FIGS. 6 to 8 that the document of "COOK BOOK" starts from the cluster #2 and changes to four cluster areas of #2, #3, #25, and #4.

Figure 10:
FIG. 10 is a diagram showing a corrected text.
Figure 11:
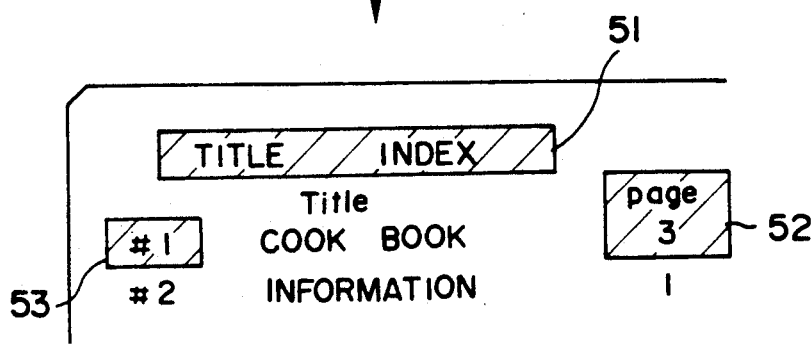
FIGS. 11 and 12 are diagrams for explaining states before and after editing.
Figure 12:
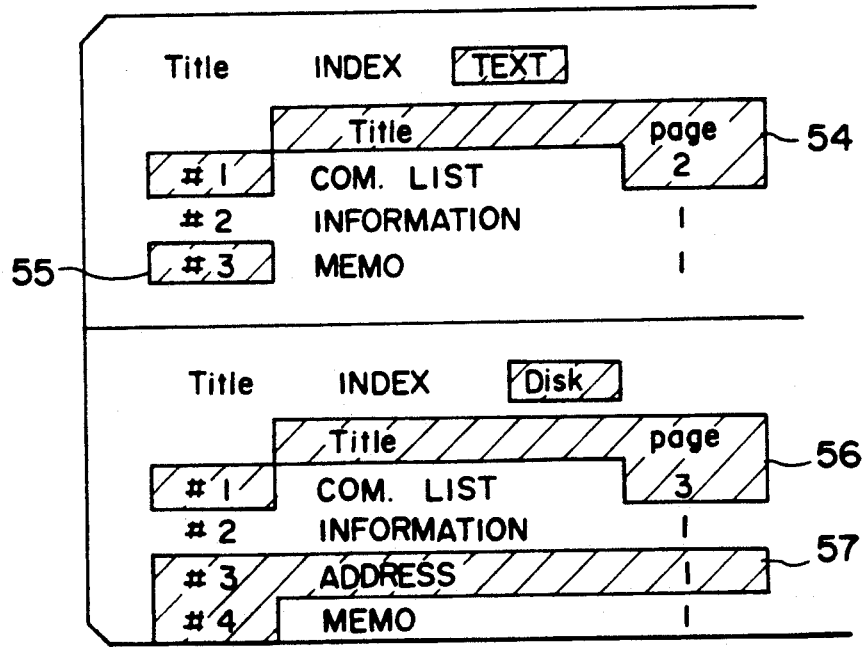

The rewrite attribute of each cluster is written is a storage area 5 in the RAM 3 of the word processor apparatus shown in FIG. 9. By checking the bit of the cluster rewrite attribute flag, it can be known that the clusters #25 and #4 were changed in the document of "COOK BOOK". FIG. 11 shows an example of a display of a TITLE INDEX when the data in a floppy disk of the FDD 12 was compared with the data in the internal TEXT area 4. A TITLE INDEX 51 is displayed by inverting the black and white indication. This means that the document was changed. Areas 52 and 53 are displayed by inverting the black and white indication. This means that the content of the page and the capacity were changed and the document of #1 was changed. FIG. 12 shows a practical example of display of both of the data in the floppy disk and the data in the TEXT in the case where among four documents of "COM, LIST", "INFORMATION", "ADDRESS", and "MEMO" stored in the floppy disk, the document of "ADDRESS" was deleted and a part of the content of the document of "COM, LIST" was edited. FIG. 10 shows the display in the case where a change occurred in a page. Namely, FIG. 10 shows a display in a page in the case where the data in the floppy disk and the data in the TEXT were compared after a document of "CHINESE 6" had been added.

Processes to perform the foregoing display operations of the word processor apparatus of the present invention will now be described with reference to FIGS. 13 to 15.

Figure 13:
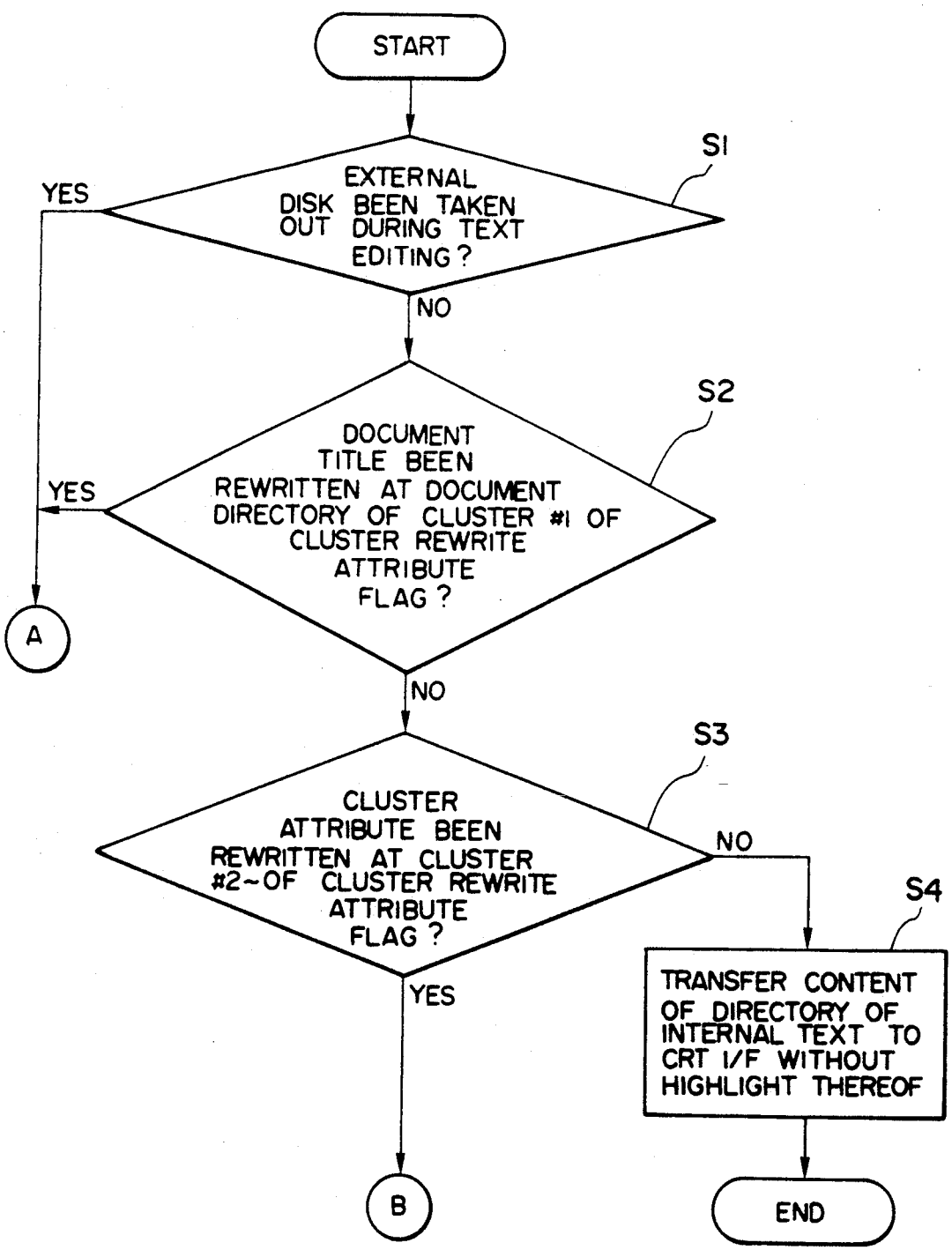
Figure 14:
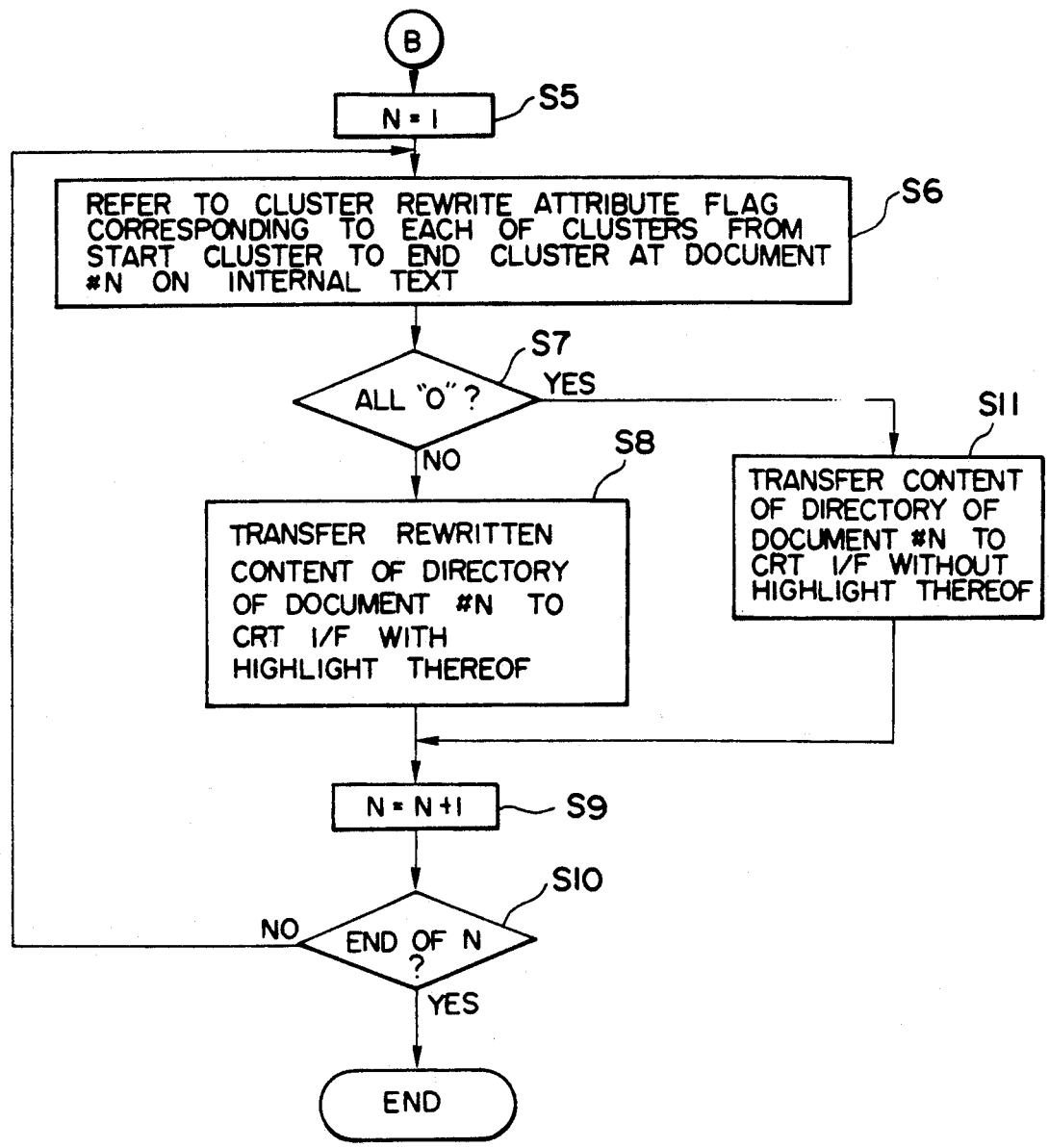

The processing programs shown in FIGS. 13 to 15 are stored in the ROM 2 as mentioned above and are executed by the MPU 1. First in step S1 in FIG. 13, a check is made to see if an external disk (hereinafter, referred to as an external DISK) has been taken out during the text editing or not. This checking process is performed on the basis of a detection signal from a detector 13 in the FDD 12. If the external DISK is not taken out, a check is made in step S2 to see if the document title has been rewritten at the document directory of the cluster #1 or not. If NO, step S3 follows and a check is made to see if the cluster attribute has been rewritten at the cluster #2 and subsequent clusters or not. If NO, step S4 follows and the content of the RAM 4 (hereinafter, referred to as an internal TEXT) is transferred to an interface (I/F) of the CRT.

If YES in step S3, step S5 in FIG. 14 follows. In step S5, N is set to 1. In step S6, a cluster rewrite attribute flag of the internal TEXT is referred. In step S7, a check is made to see if all of the flags are 0 or not. If at least one of the flags has been set to 1, this means that a document has been rewritten in step S8. Therefore, the changed portion is highlighted and transferred to the I/F of the CRT.

Next, the value of N is increased by "+1" and a check is made in step S10 to see if the end of N has been detected or not. If NO, the processes in step S6 and subsequent steps are repeated. If it is detected in step S7 that all of the flags have been set to 0, the content of the directory is transferred to the I/F of the CRT without being highlighted.

If YES in steps S1 and S2, step S12 follows. First, N is set to 1 and a check is made to see if the title of the external DIS coincides with the title of the internal TEXT or not. If they do not coincide, M is increased by "+1" and the processes in steps S13 to S16 are repeated again until the value of M has reached a predetermined value. In step S17, the non-coincident title is highlighted. The value of N is increased by "+1", and a check is made to see if the value of N has reached a predetermined value or not (step S18). A check is made in step S19 to see if the end of N has been detected or not. If NO, the foregoing processes are repeated.

If YES in step S14, a check is made in step S20 to see if the SUM coincides or not. If NO, as shown in step S21, the highlighted title is erased and the content is highlighted. Then, the processing routine is returned to step S13.

If YES in step S20, the data is compared (step S22). If both data coincide (step S23), step S24 follows. If the highlighted data exists, it is erased and transferred to the I/F of the CRT in step S24. If NO in step S23, step S21 follows.

A floppy disk has been used as an external storage medium in the foregoing embodiment. However, the external storage medium is not limited only to the floppy disks. The invention can use other external storage media such as a magnetooptic disk, a hard disk, an optical card, or the like which can store data. The display device is not limited to a CRT. The invention can use other devices such as a LCD, an EL, a fluorescent lamp, an LED array, or the like which can also display characters.

As described above, according to the present invention, by equalizing the capacity of the internal storage medium with that of the external storage medium and by also equalizing their memory structures, the transmission and reception of data between the external and internal storage media can be executed by a single operation. In addition, there is no need to convert data. Therefore, it is unnecessary to frequently access the external storage device. The work efficiency of the device is raised. The data in the external and internal storage media is compared and the changed portion is displayed. Therefore, the changed portions of the contents of the external and internal storage media can be easily checked.

I claim:

1. A text processing apparatus comprising:
    external storage means for storing a text data, which is detachable from a main body of said text processing apparatus;
    internal storage means for storing a text data, fixed in the main body of said text processing apparatus;
    display means for displaying the text data;
    editing processing means for transferring the text data stored in said external storage means to said internal storage means and for performing an editing process on the text data transferred to said internal storage means;
    means for causing said display means to display the entire text data transferred from said external storage means to said internal storage means and edited by said editing processing means and stored in said internal storage means;
    means for comparing the edited text data with the text data which has already ben stored in said external storage means;
    means for causing said display means to distinguishably display in the entire edited text data displayed on said display means the portion of the edited text data which is different from the text data stored in said external storage means, in accordance with the comparison made by said comparing means.

2. A text processing apparatus according to claim 1, wherein said display means displays the portion of the edited text data which is different from the text data stored in said external storage means in one of black and white, and wherein said display means is adapted to display other text data in the other of black and white.

3. A text processing apparatus according to claim 1, further comprising input means for inputting the text data into said external and internal storage means.

4. A text processing apparatus according to claim 1, wherein said external and internal storage means have the same memory structure and the same memory capacity.

5. A text processing apparatus comprising:
    input means for inputting text data;
    internal storage means, fixed to the inside of a main body of said text processing apparatus, for temporarily storing the text data input from said input means;
    external storage means for storing the text data stored in said internal storage means, which is detachable from the main body of said apparatus;
    text processing means for transferring the text data stored in said external storage means to said internal storage means, and for enabling a new text data to be added to the stored text data from said input means or for enabling a part of the stored text data to be changed by use of the new text data;
    display means for displaying the text data;
    means for causing said display means to display the text data to which the new text data was added by said text processing means or a part of which was changed by the new text data and which was stored in said internal storage means;
    means for comparing the text data to which the new text data was added by said text processing means or a part of which was changed by the new text data and which was stored in said internal storage means with the text data stored in said external storage means; and
    means for causing said display means to distinguishably display in the displayed text area the added or changed new text data in accordance with the comparison made by said comparing means.

6. A text processing apparatus according to claim 5, wherein said display means displays text data in one of black and white, and said display means displays the new text data which was added or changed by said text processing means in the other of black and white.

7. A text processing apparatus according to claim 5, wherein said internal and external storage means have the same memory structure.

8. A text processing apparatus comprising:
    first storage means for storing text data;
    editing processing means for editing and processing text data identical to the text data stored in said first storage means;
    second storage means for storing the text data which was edited and processed by said editing processing means;
    display means for displaying the text data stored in said second storage means;
    means for comparing the text data stored in said first storage means with the text data stored in said second storage means; and
    means for causing said display means to display the edited and processed text data on said display means and for causing said display means to distinguishably display in the displayed text data that portion of the edited and processed text which is different from the text stored in said first storage means in accordance with the comparison made by said comparing means.

9. A text processing apparatus according to claim 8, wherein said display means displays text data in one of black and white, and wherein said display means displays the portion of the text data which was edited and processed by said editing processing means in the other of black and white.

10. A text processing apparatus according to claim 8, wherein said first and second storage means have the same memory structure.

11. A text processing apparatus comprising:
    external storage means for storing a plurality of text data, said external storage means being detachable from a main body of said text processing apparatus, wherein the main body of said text processing apparatus can read and edit one or more of the plurality of text data stored in said external storage means; and
    display means for displaying the plurality of text data stored in said external storage means wherein the display condition of one or more of the plurality of text data edited by an editing process is distinguishable from that of unedited one or more of the plurality of text data.

12. A text processing apparatus according to claim 11, wherein said display means displays the one or more text data edited in said editing process in black against a white background or in white against a black background.

13. A text processing apparatus according to claim 11, wherein said external storage means comprises a floppy disc.

14. A text processing apparatus according to claim 11, wherein said external storage means comprises an optical card.

15. A text processing method comprising the steps of:
storing a plurality of text data in an external storage means detachable from a main body of a text processing apparatus, wherein the main body of said text processing apparatus can read and edit one or more of the plurality of text data stored in the external storage means; and
displaying the plurality of text data stored in the external storage means, wherein the display condition of one or more of the plurality of text data edited by an editing process is distinguishable from that of unedited one or more of the plurality of text data.

16. A text processing method according to claim 15, wherein said display step comprises the step of displaying the one or more of the plurality of text data edited by said editing process in black against a white background or in white against a black background.

17. A text processing method according to claim 15, wherein said storing step comprises the step of storing the plurality of text data in an external storage means comprising a floppy disc.

18. A text processing method according to claim 15, wherein said storing step comprises the step of storing the plurality of text data in an external storage means comprising an optical card.

19. A text processing apparatus comprising:
external storage means for storing a plurality of text data, said external storage means being detachable from a main body of said text processing apparatus, wherein the main body of said text processing apparatus can read and edit one or more of the plurality of text data stored in said external storage means; and
display means for displaying one of the plurality of text data stored in said external storage means wherein the display condition of one or more of the plurality of text data edited by an editing process is distinguishable from that of unedited one or more portions of the one text data.

20. A text processing apparatus according to claim 19, wherein said display means displays the one or more of the plurality of text data edited by said editing process in black against a white background or in white against a black background.

21. A text processing apparatus according to claim 19, wherein said external storage means comprises a floppy disc.

22. A text processing apparatus according to claim 19, wherein said external storage means comprises an optical card.

23. A text processing method comprising the steps of:
storing a plurality of text data in an external storage means detachable from a main body of a text processing apparatus, wherein the main body of said text processing apparatus can read and edit one or more of the plurality of text data stored in the external storage means; and
displaying one of the plurality of text data stored in the external storage means, wherein the display condition of one or more of the plurality of text data edited by an editing process is distinguishable from that of unedited one or more portions of the one text data.

24. A text processing method according to claim 23, wherein said displaying step comprises the step of displaying the one or more of the plurality of text data edited by said editing process in black against a white background or in white against a black background.

25. A text processing method according to claim 23, wherein said storing step comprises the step of storing the plurality of text data in an external storage means comprising a floppy disc.

26. A text processing method according to claim 23, wherein said storing step comprises the step of storing the plurality of text data in an external storage means comprising an optical card.

* * * * *

UNITED STATES PATENT AND TRADEMARK OFFICE
CERTIFICATE OF CORRECTION

PATENT NO. : 5,261,040
DATED : November 9, 1993
INVENTOR(S) : NAOHISA SUZUKI

It is certified that error appears in the above-indentified patent and that said Letters Patent is hereby corrected as shown below:

TITLE PAGE

[57] ABSTRACT
    Line 2, "for" should read --from--.
    Line 9, "edited processed" should read --edited-processed--.

COLUMN 1
    Line 23, "in" should be deleted".
    Line 50, "ple;" should read --ple:--.
    Line 57. "techniques. It is" should read --techniques. ¶It is--.

COLUMN 3
    Line 32, "clusters, thereof" should read --clusters thereof,--.

COLUMN 4
    Line 34, "DIS" should read --DISK--.
    Line 56, "the" should be deleted.
    Line 61, "a LCD," should read --an LDC,--.

UNITED STATES PATENT AND TRADEMARK OFFICE
CERTIFICATE OF CORRECTION

PATENT NO.   : 5,261,040
DATED        : November 9, 1993
INVENTOR(S)  : NAOHISA SUZUKI It is certified that error appears in the above-indentified patent and that said Letters Patent is hereby corrected as shown below:

<u>COLUMN 5</u>
    Line 29, "ben" should read --been--.

Signed and Sealed this

Twenty-first Day of June, 1994

Attest:

BRUCE LEHMAN

*Attesting Officer*      *Commissioner of Patents and Trademarks*